United States Patent [19]

Shuford

[11] Patent Number: 4,830,919

[45] Date of Patent: * May 16, 1989

[54] COMPOSITION FOR FORMING A PROTECTIVE COATING ON CARBON-CARBON SUBSTRATES AND ARTICLE

[75] Inventor: David M. Shuford, Grand Prairie, Tex.

[73] Assignee: LTV Aerospace & Defense Company, Dallas, Tex.

[*] Notice: The portion of the term of this patent subsequent to Apr. 29, 2003 has been disclaimed.

[21] Appl. No.: 852,236

[22] Filed: Apr. 15, 1986

Related U.S. Application Data

[60] Division of Ser. No. 518,831, Aug. 1, 1983, Pat. No. 4,585,675, which is a continuation-in-part of Ser. No. 251,798, Apr. 7, 1981, abandoned.

[51] Int. Cl.$^4$ .................................................. B32B 9/00
[52] U.S. Cl. ..................................... 428/408; 428/446; 428/448; 428/688; 428/689; 428/697; 428/698; 428/702; 501/85; 501/89; 501/154; 106/286.5; 106/286.8; 106/287.17
[58] Field of Search ............. 106/286.5, 286.8, 287.17; 428/408, 446, 448, 688, 689, 697, 698, 702; 501/88, 89, 154

[56] References Cited

U.S. PATENT DOCUMENTS

| | | | |
|---|---|---|---|
| 2,843,507 | 7/1958 | Long | 117/129 |
| 3,140,193 | 7/1964 | Kane | 117/8 |
| 3,275,471 | 9/1966 | Lowell et al. | 117/169 |
| 3,348,929 | 10/1967 | Valtschev et al. | 29/180 |
| 3,385,723 | 5/1968 | Pickar | 117/46 |
| 3,396,054 | 8/1968 | Gremion | 117/227 |
| 3,406,044 | 5/1970 | Harris | 117/215 |
| 3,476,586 | 11/1969 | Valtchev et al. | 117/71 |
| 3,485,296 | 12/1969 | Lazaridis et al. | 165/105 |
| 3,554,717 | 1/1971 | Shaffer et al. | 51/307 |
| 3,562,007 | 2/1971 | Bockstie, Jr. | 117/218 |
| 3,666,507 | 5/1972 | Alper et al. | 106/44 |
| 3,672,936 | 6/1972 | Ehrenreich | 117/46 |
| 3,753,744 | 8/1973 | Komaru et al. | 106/44 |
| 3,977,294 | 8/1976 | Jahn | 109/80 |
| 4,045,593 | 8/1977 | Hill et al. | 427/59 |
| 4,119,189 | 10/1978 | Ehrenreich | 192/107 |
| 4,141,948 | 2/1979 | Askow et al. | 264/101 |
| 4,275,095 | 6/1981 | Warren | 427/419.7 X |
| 4,465,777 | 8/1984 | Shuford | 428/408 X |
| 4,471,023 | 9/1984 | Shuford | 428/698 X |
| 4,500,602 | 2/1985 | Patten et al. | 428/698 X |
| 4,585,675 | 4/1986 | Shuford | 427/397.8 R |

FOREIGN PATENT DOCUMENTS

1026055  4/1966  United Kingdom .

OTHER PUBLICATIONS

Donald C. Rogers et al., "Material Development Aspects of an Oxidation Protection System for a RCC Composite" (pp. 308–330).
Donald M. Curry et al., "Material Characteristics of Space Shuttle Reinforced Carbon Carbon" (pp. 1524–1538).
Curry et al., Material Characteristics of Space Shuttle Reinforced Carbon-Carbon (4/73) (pp. 1524–1538).
Rogers et al., Formation Mechanism of a Silicon Carbide Coating for a Reinforced Carbon-Carbon Composite (pp. 319–336).
Rogers et al., Material Development Aspects of an Oxidation Protection System for a Reinforced Carbon--Carbon Composite (pp. 308–330).

Primary Examiner—John E. Kittle
Assistant Examiner—Susan S. Rucker
Attorney, Agent, or Firm—S. S. Sadacca; J. M. Cate

[57] ABSTRACT

In accordance with the invention, a composition of matter is provided for forming a coating for protecting carbonaceous substrates from degradation at elevated temperatures. The composition of matter is a mixture of particulate silicon, silicon carbide and alumina. The mixture contains between about 40% and 50% silicon by weight of the total composition, between about 30% and 50% silicon carbide by weight of the total composition and between about 20% and 30% alumina by weight of the total composition. A method is provided for forming a primary protective coating on carbonaceous substrates utilizing the aforesaid mixture. An enhancement coating is provided for sealing the primary coating in applications where the substrate will be subjected to elevated temperatures and temperature cycling.

20 Claims, No Drawings

COMPOSITION FOR FORMING A PROTECTIVE COATING ON CARBON-CARBON SUBSTRATES AND ARTICLE

This application is a divisional application of application Ser. No. 518,831 filed Aug. 1, 1983 now U.S. Pat. No. 4,585,675 issued Apr. 29, 1986 which in turn is a continuation-in-part of application Ser. No. 251,798 filed Apr. 7, 1981, now abandoned.

BACKGROUND ART

Graphite and carbon materials, especially reinforced carbon-carbon composite substrate materials, are subject to many applications in modern industry, particularly in the aerospace and aviation fields. However, such materials, when unprotected, are subject to degradation at elevated temperatures. Since many applications involve high temperatures, resistance to high temperature and thermal shock are often required properties of the material.

Reinforced carbon-carbon composite substrates are generally constructed of fibers and bound by a carbon matrix, resulting in a material having excellent structural properties. Generally, carbonaceous fibers such as polyacrylonitrile, rayon or pitch-based fibers are utilized. Carbon-carbon impregnation materials generally are phenolic, furfuryl or pitch-based materials. However, the use of a specific substrate material is not a limitation upon the present invention.

Graphite and carbon materials, including reinforced carbon-carbon composites, are subject to degradation, such as oxidation, when utilized in high temperature environments in the presence of oxygen. Generally, an unprotected graphite or carbon material will begin to oxidize at temperatures in excess of about 650° F. in air. Therefore, in order to effectively utilize these materials in high temperature applications, it is necessary to provide protection from degradation, including oxidation. Accordingly, a need exists for a composition of matter and method for forming protective coatings on graphite and carbon materials, and especially for reinforced carbon-carbon composite materials.

One indication of high temperature degradation resistance is the percent weight change of the coated substrate or part that is exhibited over a period of exposure in an elevated temperature environment containing oxygen. It is desirable for a coated substrate not to exhibit a significant weight change after exposure to high temperatures in oxygen containing environments since this could affect the performance of the device incorporating such materials.

Accordingly, a need exists for a method and composition of matter for forming a protective coating on carbon substrates that provides resistance to degradation at elevated temperatures of up to about 3000° F. Further, a need exists for a method and composition of matter for forming a protective coating on reinforced carbon-carbon composite substrates wherein protection from degradation where at elevated temperatures where temperature cycling frequently occurs, thereby subjecting the substrate to varying temperatures between about 3000° F. and below 0° F.

DISCLOSURE OF THE INVENTION

In accordance with the present invention, a composition and method is provided for forming a primary protective coating on carbonaceous substrate materials. The primary coatings formed in accordance with the method and composition of the present invention exhibit excellent protection from degradation at temperatures between about 2500° F. and 3000° F. in oxygen containing environments.

Broadly stated, the composition for forming a primary protective coating on carbonaceous substrate materials comprises between about 40% and 50% particulate silicon by weight of the total composition, between about 30% and 50% particulate silicon carbide by weight of the total composition and between about 20% and 30% particulate alumina by weight of the total composition. The preferred composition contains about 30% by weight silicon carbide, about 50% by weight silicon and about 20% by weight alumina.

In another aspect, the uniform mixture of particulate silicon, silicon carbide and particulate alumina can be admixed with a carrier liquid such as water, isopropyl alcohol and mixtures thereof. Sufficient carrier liquid should be employed to form a slurry that can be poured or pumped into a retort. In general from about 75 parts by weight of the powder mixture to about 25 parts by weight of carrier liquid is used to form a slurry.

In accordance with the method of the present invention, a primary protective coating is formed on carbonaceous substrates from an essentially uniform mixture of particulate silicon, silicon carbide and alumina in the range of the aforesaid preferred compositions by contacting the substrate with the dry mixture or the slurried mixture and, thereafter, heating the substrate to between about 2950° F. and 3100° F. in an inert atmosphere for a period of time sufficient to form a coating of the desired thickness on the substrate. Generally, the substrate and mixture will be heated for a period of between about 4 and 7 hours to form the primary coating that is usually between about 5 and 50 mils thick. The thickness of the primary coating obtained depends on several factors, including the time-temperature profile (TTP), the concentration of components and the type of substrate material.

In applications where the coated substrate will be exposed to cyclic temperatures in which temperatures above and below 2500° F. are encountered, an enhancement coating can be applied to the primary coating. The combination of the primary coating formed from the particulate silicon, silicon carbide and aluminum mixture and the enhancement coating results in a protective coating system that provides excellent protection from degradation and oxidation at cyclic temperatures of between about −300° F. and 3000° F.

The enhancement coating is formed by impregnating the primary coating with tetraethyl orthosilicate. The tetraethyl orthosilicate is then heat cured on the primary coating forming a silica coating. Thereafter, a mixture of a liquid alkali silicate and silicon carbide powder is applied to the surface and heat cured. Alternatively, a mixture of water, sodium borate and sodium silicate can be substituted for the liquid alkali silicate.

The enhancement coating has the effect of sealing the primary coating formed from the mixture of silicon, silicon carbide and alumina, thereby preventing direct exposure of the substrate to the atmosphere when temperature cycling occurs, which causes the primary coating to expand and contract. A substrate having the primary coating and the enhancement coating can be subjected to temperature cycling in which temperatures as high as about 3000° F. and as low as −300° F. are attained in oxygen containing environments without significant detrimental affects to the substrate.

DETAILED DESCRIPTION

In accordance with one aspect of the present invention, a composition is provided for forming a primary protective coating on carbon-carbon substrate materials. While the present invention is primarily concerned with protecting reinforced carbon-carbon composite substrates, the invention is also applicable to the formation of coatings on various types of graphite and carbon substrates. The term "carbonaceous substrate" for purposes of this invention includes all such materials.

The primary coating is useful for protecting a substrate from degradation at sustained temperatures of between about 2500° F. and 3000° F. without additional protective coatings.

The composition for forming the primary protective coating on carbonaceous substrate materials comprises between about 40% and 50% particulate silicon by weight of the total composition, between about 30% and 50% particulate silicon carbide by weight of the total composition and between about 20% and 30% particulate alumina by weight of the total composition. The most preferred composition contains about 30% by weight silicon carbide, about 50% by weight silicon and about 20% by weight alumina.

Preferably, the particle size of the silicon and alumina components is about 325 Tyler standard screen scale. The silicon carbide is preferably between about 4.5 and 20.5 microns.

The most preferred type of silicon carbide is sold under the trade designation "RA 1200, Class 1-green grit" by the Carborundum Company, a Delaware corporation. The most preferred type of alumina is sold by the Aluminum Co. of America of Pittsburgh, Pa. under the trade designation "T-61."

In utilizing the composition in accordance with the present invention, the components are mixed together to form a uniform mixture. In order to form the primary protective coating, the mixture is brought into contact with the substrate that is to be coated. Generally, the entire substrate or part will be encased by the mixture to form a protective coating on the entire surface of the substrate. The substrate to be coated is placed in a graphite retort or other container that is capable of withstanding very high temperatures. The mixture is uniformly packed around the substrate so that the mixture completely encases the substrate. Preferably, the compaction of the mixture is tested for surface compaction. It is preferred that the surface compaction unconfined strength be between about 5.0 and 6.0 tons/ft$^2$ which can be measured on a soil tester sold by Soil Test Inc. of Chicago, Ill., Model No. CL 700, which has a probe of circular cross-section, one-half inch in diameter and is inserted to a depth of one-quarter inch into the mixture.

As an alternative to packing the dry uniform mixture to completely encase the carbon-carbon substrate as explained above, a slurry can be prepared with the uniform mixture by combining it with a carrier liquid. Suitable carrier liquids include water, isopropyl alcohol and mixtures thereof, for example. Sufficient liquid carrier is utilized to form a slurry which can be poured or pumped into the retort. Preferably from about 75 parts powder to about 25 parts by weight of the liquid carrier is employed.

When using a slurry, a first portion is poured into the retort prior to placement of part to form the initial $\frac{3}{4}$ inch thickness of pack material. The retort must be level prior to forming this layer. The bubbles are removed by vibrating or agitating the slurry after it is poured into the retort. Before placement of the part in the retort a $\frac{1}{8}$ inch layer of wet pack mix is poured into retort to insure uniform contact with lower surface of parts. Balsa wood spacers can be used to maintain the alignment of the part as the retort is being filled. The balsa wood spacers can be raised or removed as required when the slurry is being added to the retort.

After filling the retort, the bulk of the solvent is allowed to flash off at ambient condition. The retort is then dried at 400° F. for 16 or more hours prior to placement in the coating furnace. Vacuum drying in the coating furnace may be used to supplement or replace the 400° F. oven drying cycle.

Thereafter, either in the case of a dry mix or slurry pack, the graphite retort is placed in an inert atmosphere. Preferably an argon gas atmosphere is utilized at a pressure of about 3 psi (gauge). The graphite retort and its contents are then heated to form the coating. The furnaces used for heating to produce the protective coating generally have graphite resistance tubes as heating elements or use graphite receptors which are heated by induction. The retort is then heated by radiation.

Generally, the retort and its contents are heated in the range of between about 2950° F. and 3100° F. for a period of time sufficient to form the protective coating of a desired thickness. It is generally preferred to first heat the retort and its contents to about 2800° F. so that a uniform elevated temperature can be more easily attained. After the initial heating, most preferably the retort and its contents are maintained at a temperature of about 2950° F. for about two hours. Then the retort and its contents are maintained at a temperature of about 3000° F. for two more hours. Finally, the retort and its contents are maintained at a temperature of about 3050° F., again for two hours. The retort and its contents are then cooled. Generally, cooling is accomplished by turning off the power to the furnace. The foregoing described step-heating process is preferred because a more uniform coating results than if the retort and its contents were heated to a fixed temperature. Generally, the six hour step-heating process as previously described produces a primary coating that is between about 5 and 50 mils thick.

It should be understood that the coating described herein is not an additional thickness of material, but rather is a change in the composition of the upper surface of the substrate. The process of the present invention results in a negligible increase in the thickness of the part.

The present invention is advantageous because it permits the use of a high silicon concentration. The free silicon, when subjected to an oxidation atmosphere, reacts to produce silicon dioxide which acts in a glass like manner becoming fluid at higher temperatures and enhancing the coating's protection by creating a seal against more oxidation. In contrast, prior coatings which utilized a high amount of silicon carbide, exposed a large amount of silicon carbide to an oxidizing atmosphere which, upon oxidation, yields carbon oxide products as well as glass products. The gaseous products formed in the oxidizing atmosphere which escape from the substrate result in an outgassing effect. This outgassing of the oxidation products from the substrate is disruptive to the glass coating which is formed by the silicon oxide and thus permits further oxidation of the part.

The high free silicon content of the present invention is also advantageous in that the free silicon modifies the thermal expansion of the silicon carbide material so that the coating retained has a coefficient of thermal expansion closer to that of the substrate. Therefore, upon cooling from the 3000° F. temperature used to form the coating, there is less relative movement between the material of the coating and the remainder of the substrate itself. Thus cracks and craze patterns which would form in the prior art coatings are greatly reduced. Avoidance or minimization of cracks is important to prevent the entry of oxygen.

The present invention utilizes high amounts of alumina which permits the formation of thicker coatings. During the curing process the alumina releases oxygen which reacts with carbon, producing carbon dioxide which escapes as a gas, and thus in effect removes carbon from the substrate structure, thereby providing room for the formation of silicon carbide without spalling or with reduced spalling.

While identification of the exact composition of the coating that is formed in accordance with the present invention is not necessary for practicing the invention, it is believed that the coatings primarily contain silicon carbide, free silicon, and alumina in the outer five mil layer of the coating.

The mixture and method previously described is useful for forming a primary coating that is capable of protecting substrates at sustained temperatures of between about 2500° F. and 3000° F. However, if the substrate is subjected to temperature cycling where temperatures above and below 2500° F. are attained, an enhancement coating should generally be utilized to protect the substrate, since when temperature cycling occurs, the primary coating expands and contracts. Also, the enhancement coating has the effect of sealing the substrate surface from the surrounding environment should there be any imperfections in the primary coating.

In accordance with the invention, the enhancement coating is formed by impregnating the primary coating with tetraethyl orthosilicate. The tetraethyl orthosilicate is then heat cured forming a silica coating which fills porosity in the coating and substrate.

Preferably, the tetraethyl orthosilicate is applied about five times to the primary coating before curing to insure that a sufficient amount of tetraethyl orthosilicate has impregnated the primary coating. Generally, the heat curing takes place at between about 225° F. and 275° F. after each impregnation for between about 45 and 60 minutes after the tetraethyl orthosilicate solidifies, forming crystals. After the fifth impregnation the part is preferably heated for about two hours after crystallization of the tetraethyl orthosilicate. The part is then cooled and reheated to between about 375° F. and 425° F. for between about 2 and 2.5 hours. Finally, the part is heated and maintained at between about 565° F. and 625° F. for between about 6 and 7 hours.

Thereafter, a mixture of a liquid alkali silicate and silicon carbide powder is applied to the surface and is then heat cured. Preferably the weight ratio of the alkali silicate to silicon carbide is about 1:1. Alternatively, a mixture of water, sodium borate and sodium silicate can be substituted for the liquid alkali silicate. Preferably, per 100 ml of water, the mixture includes 10 gm of sodium borate and 100 ml of a sodium silicate solution containing 39% solids sold by Ridlen's Mgf. Co. of Dallas, Tex. Generally, heating in the range of between about 200° F. and 600° F. is used to provide curing. The preferred type of alkali silicate utilized for the slurry of alkali silicate and silicon carbide is sold under the tradename "Sermabond 487" by the Sermetel Company of Limerick, Pa. The preferred type of silicon carbide is sold under the trade designation "RA 1200-black grit" by the Carborundum Company. Preferably, the powder mixture contains equal parts of the silicon carbide powder and powder formed from graphite felt that has been converted to powdered silicon carbide. Preferably, the graphite felt utilized is "grade WDF" from the Union Carbide Company, Carbide Products Division of New York, N.Y. The graphite felt can be converted to silicon carbide felt by packing the felt in a mixture containing between about 30% and 60% by weight silicon carbide, between about 30% and 50% by weight silicon and between about 10% and 20% by weight alumina. The packed graphite felt is heated to between about 2950° F. and 3050° F. for about 5 to 6 hours. After the graphite felt has been converted to silicon carbide felt, the felt is powdered by any suitable method, such as a ball mill. The powdered silicon carbide made from the converted felt should have a small random fiber size. Preferably, the fibers will have a diameter of about 8 microns and will be of varied length, ranging between about several microns and 0.01 inches.

The slurry is applied to the surface and heat cured. The slurry can be applied to the surface using a brush, spatula or other type of suitable applicator. Preferably, the area of the part that is being coated with the slurry is kept in a wet condition as the slurry is being applied. The excess slurry is wiped off with a cheesecloth material, for example.

After application of the slurry to the part, it is dried and heat cured. Preferably, the drying procedure is accomplished under ambient conditions for a period of about 16 hours. Thereafter, the slurry is heat cured, preferably by heating in the range of between about 185° F. and 225° F. for at least about two hours, thereafter heating in the range of between about 375° F. and 425° F. for at least about two hours and finally heating in the range of between about 575° F. and 625° F. for between about four and seven hours.

For some types of substrates, it may be advantageous to pretreat the substrate prior to formation of the primary coating. In some cases, the primary coating is formed on the substrate more uniformly when the substrate is pretreated. Three types of pretreatment have been utilized. In accordance with one type of pretreatment, the substrate is impregnated with tetraethyl orthosilicate and cured. Preferably, the tetraethyl orthosilicate is applied five times and between each application curing is accomplished by heating between about 225° F. and 275° F. for about 30 minutes after crystallization of the tetraethyl orthosilicate occur. After the fifth impregnation the substrate has any excess material removed therefrom and is then heat treated by heating at about 400° F. for two hours and 600° F. for four hours.

The second type of pretreatment is heat treatment. Generally, the substrate is heated in an inert atmosphere, preferably argon, at a temperature of about 3250° F. for about one hour.

The third type of pretreatment is a combination of heat treatment followed by treatment with tetraethyl orthosilicate, which can be accomplished as previously described.

Various advantages of the invention are apparent from the following examples:

EXAMPLE 1

A reinforced carbon-carbon composite substrate is coated in accordance with the present invention. The substrate is pretreated by impregnating five times with tetraethyl orthosilicate and curing after each time as set forth in the description of the preferred tetraethyl orthosilicate pretreatment. The primary coating is formed by utilizing a mixture of 30% silicon carbide, 50% silicon and 20% alumina (by weight). The silicon carbide utilized can be obtained from the Carborundum Company under the trade designation "RA 1200-Green Grit", the alumina can be obtained from the Alumina Company of America under the trade designation "T-61" and the particulate silicon utilized has a particle size of about 325 Tyler Standard Screen scale.

The substrate is packed in a graphite retort to the preferred surface compaction. Thereafter, the composition is dried under vacuum and placed in an inert atmosphere in the heating furnace. The retort and its contents are heated to about 2800° F. and thereafter heated at 2950° F. for two hours, then further heated at 3000° F. for two hours and finally heated at 3050° F. for two hours. The substrate is then removed from the retort, cleaned and then the enhancement coating is applied. Application of the enhancement coating includes impregnation with tetraethyl orthosilicate which is applied five times, with heat curing taking place between about 225° F. and 275° F. after each impregnation for between about 45 and 60 minutes after the tetraethyl orthosilicate solidifies. After the fifth impregnation the substrate is heated to between about 225° F. and 275° F. for about two hours after crystallization of the tetraethyl orthosilicate. The substrate is then cooled and reheated to a temperature of about 400° F. for two hours and then heated at about 600° F. for about four hours.

Thereafter, a mixture of a liquid alkali silicate, "Sermabond 487" and silicon carbide is applied to the substrate. The alkali silicate and silicon carbide are present in a ratio of about 1:1. The silicon carbide utilized is a 50-50 mixture of "RA 1200-Black Grit" sold by the Carborundum Company and silicon carbide powder produced from graphite felt that was converted to silicon carbide felt. To form the converted graphite felt, graphite felt "grade WDF" can be obtained from the Union Carbide Company and converted to silicon carbide felt. The slurry is then applied to the surface of the substrate and heat cured.

A coated substrate, having the enhancement coating thereon, and prepared substantially as described above was subjected to air at a temperature of about 1000° F. for thirty hours. The net change in mass of the substrate was −0.16 kg/m² of substrate surface area.

EXAMPLE 2

A reinforced carbon-carbon composite substrate is coated as set forth in Example 1. The substrate was subjected to air at 2450° F. for thirty hours. The net mass change of the substrate was +0.008 kg/m² of substrate surface area. Substantially all of the mass change occurred in the first three hours of exposure.

While the invention has been described with respect to preferred embodiments, it will be understood that the invention is capable of numerous rearrangements, modifications and alterations and such rearrangements, modifications and alterations are intended to be within the scope of the appended claims.

I claim:

1. A composition for forming a coating on a carbonaceous substrate to protect the substrate from degradation at elevated temperatures comprising a mixture of:
   (a) between about 40% and 50% particulate silicon by weight of the total composition;
   (b) between about 30% and 50% particulate silicon carbide by weight of the total composition; and
   (c) between about 20% and 30% particulate alumina by weight of the total composition.

2. The composition as recited in claim 1 wherein:
   (a) particulate silicon is present in an amount of about 50% by weight of the total composition;
   (b) particulate silicon carbide is present in an amount of about 30% by weight of the total composition; and
   (c) particulate alumina is present in an amount of about 20% by weight of the total composition.

3. The composition as recited in claim 1 wherein the particle size of the particulate silicon and alumina components is about 325 Tyler standard screen scale and the particle size of the particulate silicon carbide is between about 4.5 and 20.5 microns.

4. A coated substrate resistant to degradation due to exposure to oxygen at elevated temperatures comprising:
   (a) a carbonaceous substrate; and
   (b) a coating on said substrate comprising between about 40 and 50% by weight silicon, between about 30 and 50% by weight silicon carbide, and between about 20 and 30% by weight alumina, said percentages being based on the weight of the coating.

5. The coated substrate of claim 4 wherein said coating comprises about 50% by weight of silicon, about 30% by weight silicon carbide, and about 20% by weight alumina, said percentages being based on the weight of the coating.

6. A coated substrate resistant to degradation due to exposure to oxygen at elevated temperatures comprising:
   (a) a carbonaceous substrate; and
   (b) a coating formed on said carbonaceous substrate by contacting the substrate with an essentially uniform mixture of silicon present in an amount of between about 40 and 50% by weight of the total mixture, silicon carbide present in an amount of between about 30 and 50% by weight of the total mixture, and alumina present in an amount of between about 20 and 30% by weight of the total mixture; and
   (c) thereafter heating said mixture and the substrate in the range of between about 2950° and 3100° F. in an inert atmosphere for a period of time sufficient to form a coating of the desired thickness on the substrate.

7. The coated substrate of claim 6 wherein said substrate and mixture are heated for between about 4 and 7 hours.

8. The coated substrate of claim 6 wherein said substrate and mixture are heated to a temperature of about 2800° F. and thereafter are maintained at a temperature of about 2950° F. for a period of about two hours, then at a temperature of about 3000° F. for about two hours, and then at a temperature of about 3050° F. for about two hours.

9. The coated substrate of claim 6 wherein said mixture contacts said substrate by encasing the substrate in the mixture, said mixture being contained by a graphite retort.

10. The coated substrate of claim 6 and further comprising an enhancement coating over said coating for sealing said coating.

11. The coated substrate of claim 10 wherein said enhancement coating is formed by:
   (a) impregnating the coating with tetraethyl orthosilicate;
   (b) heat curing the tetraethyl orthosilicate applied to said coating;
   (c) applying a mixture of a liquid alkali silicate and particulate silicon carbide to said coating; and
   (d) heat curing the alkali silicate and silicon carbide mixture.

12. The coated substrate of claim 11 wherein said tetraethyl orthosilicate is heat cured by heating to a temperature of between about 225° F. and 625° F., and said alkali silicate and silicon carbide mixture is heat cured by heating to a temperature of up to about 625° F.

13. A coated substrate resistant to degradation due to exposure to oxygen at elevated temperatures comprising:
   (a) a carbonaceous substrate; and
   (b) a coating on said substrate, said coating formed by contacting the substrate with a slurry comprising a uniform mixture of silicon present in an amount of between about 40 and 50% by weight of the total mixture, silicon carbide present in an amount of between about 30% and 50% by weight of the total mixture, and alumina present in an amount of between about 20% and 30% by weight of the total mixture, where from about 75 parts of the uniform mixture is combined with about 25 parts by weight of a liquid carrier to form a slurry; and
   thereafter heating said slurry and said substrate to a temperature of between about 2950° F. and 3100° F. in an inert atmosphere for a period of time sufficient to form the coated substrate.

14. The coated substrate of claim 13 wherein said heating occurs for between about 4 and 7 hours.

15. The coated substrate of claim 13 wherein said slurry and substrate are heated to a temperature of about 2800° F. and thereafter the slurry and substrate are maintained at a temperature of about 2950° F. for a period of about two hours, then at a temperature of about 3000° for about two hours, and then at a temperature of 3050° F. for about two hours.

16. The coated substrate of claim 13 wherein said slurry contacts the substrate by encasing the substrate in said slurry, said slurry being contained in a graphite retort.

17. The coated substrate of claim 13 and further comprising forming an enhancement coating over said coating for sealing said coating.

18. The coated substrate of claim 13 wherein said enhancement coating is formed by:
   (a) impregnating the coating with tetraethyl orthosilicate;
   (b) heat curing the tetraethyl orthosilicate applied to said coating;
   (c) applying a mixture of a liquid alkali silicate and particulate silicon carbide to said coating; and
   (d) heat curing the alkali silicate and silicon carbide mixture.

19. The coated substrate of claim 13 wherein said tetraethyl orthosilicate is heat cured by heating to a temperature of between about 225° F. and 625° F., said alkali silicate and silicon carbide mixture is heat cured by heating to a temperature of up to about 625° F.

20. A method for protecting a carbonaeous substrate from degradation by oxidation at elevated temperatures comprising forming a coating on said substrate, said coating comprising a mixture of:
   (a) between about 40 and 50% silicon by weight of the total composition;
   (b) between about 30 and 50% silicon carbide by weight of the total composition; and
   (c) between about 20 and 30% alumina by weight of the total composition.

* * * * *